United States Patent
Torrens et al.

(10) Patent No.: US 8,053,016 B2
(45) Date of Patent: Nov. 8, 2011

(54) AGGLUTINANT COMPOUND AND AGGLUTINATED PRODUCT FOR RECONSTITUTING POWDERS OF VEGETAL ORIGIN

(75) Inventors: Gilson Luiz Torrens, Curitiba (BR); Bianca Iodice, Curitiba (BR)

(73) Assignee: IOTI International Industria e Comercio de Produtos Aromaticos LTDA, Campo Magro (BR)

(*) Notice: Subject to any disclaimer, the term of this patent is extended or adjusted under 35 U.S.C. 154(b) by 0 days.

(21) Appl. No.: 11/917,302

(22) PCT Filed: Jul. 7, 2006

(86) PCT No.: PCT/IB2006/052316
§ 371 (c)(1),
(2), (4) Date: Dec. 12, 2007

(87) PCT Pub. No.: WO2007/007269
PCT Pub. Date: Jan. 18, 2007

(65) Prior Publication Data
US 2008/0206432 A1      Aug. 28, 2008

(30) Foreign Application Priority Data
Jul. 8, 2005  (BR) ..................................... 0502935

(51) Int. Cl.
*A23K 1/00* (2006.01)
*A23G 3/20* (2006.01)
*A23L 1/00* (2006.01)
*A24B 3/14* (2006.01)

(52) U.S. Cl. ......... 426/615; 426/103; 426/285; 131/370

(58) Field of Classification Search .................. 131/353, 131/354, 355, 356, 357, 370; 426/615
See application file for complete search history.

(56) References Cited

U.S. PATENT DOCUMENTS

| 3,016,907 | A | * | 1/1962 | Rosenberg et al. | ........... 131/370 |
| 4,341,228 | A | * | 7/1982 | Keritsis et al. | ................ 131/354 |
| 4,674,519 | A | * | 6/1987 | Keritsis et al. | ................ 131/355 |
| 5,148,821 | A | * | 9/1992 | Best et al. | .................... 131/370 |

FOREIGN PATENT DOCUMENTS

| EP | 0 056 308 | | 1/1982 |
| JP | 61257143 | | 11/1986 |
| JP | 2004339454 | * | 2/2004 |
| JP | 2004107413 | | 4/2004 |
| JP | 2004182772 | | 7/2004 |
| JP | 2004339454 | | 12/2004 |
| WO | WO 02/34857 | | 5/2002 |
| WO | WO 03/055337 | | 7/2003 |

OTHER PUBLICATIONS

Miyashita et al. JP2004-182772 (2004). Machine Translation.*
Narutaki JP 2004-107413 (2004). Machine Translation.*

* cited by examiner

*Primary Examiner* — Humera Sheikh
*Assistant Examiner* — Lela S Williams
(74) *Attorney, Agent, or Firm* — Lucas & Mercanti, LLP

(57) ABSTRACT

An agglutinant compound and agglutinated product for reconstituting powders of vegetal origin, that allow employing a lamination or similar process, being said agglutinated product comprised of agglutinant compound and a vegetal mass formed by the powder of vegetal origin, that may range from 5-50% (mass/mass, regarding the powder mass used), with drying temperature ranging between 100-400° C., thickness between 0.05-2.50 mm and vegetal film humidity between 8 and 20%; being said agglutinant compound formed only by a mixture of polymers of hydroxylated organic acids, such as lactic acid and malic acid, and it may contain agents improving its agglutinant and sensorial properties.

17 Claims, No Drawings

AGGLUTINANT COMPOUND AND AGGLUTINATED PRODUCT FOR RECONSTITUTING POWDERS OF VEGETAL ORIGIN

BACKGROUND ART OF THE INVENTION

1. Field of the Invention

The present invention relates to the field of vegetal product industrial processes, and more particularly the invention objects to a practical and innovative chemical agglutinant compound for producing laminates from particulate aggregates and vegetal powder originated from tobacco, tea leaves, aromatic herbs, etc., such technology consists of composing a homogeneous mixture of vegetal structures residues rejected as raw material due to its granulometry out of dimensional standards, being larger or smaller than specific values, where the compound of the invention is aggregated with the material described to be laminated and dried so as to form leaves and pellicles with the objective of returning them to industrial process, rationalizing its reuse and providing economy and environmental responsibility.

2. Description of the Prior Art

It is well known in industry operating with vegetal products transformation processes such as tobacco, coffee, tea, mate herb, etc., that such processes release large quantities of residues as powders that in general are rejected. These powders have such granulometry so that industries are not interested therein, since they can not be processed for optimal consumption.

Due to these issues, it would be very convenient to have the possibility of reconstituting such powders so as to reconvert them in products of interest for consumption.

BRIEF DESCRIPTION OF THE INVENTION

Thus, it is an objective of the present invention to provide an agglutinant compound for reconstituting powders of vegetal origin, such as residual powders resulting from tobacco industry, from mate herb, from tea, from coffee and similar, powders that usually are rejected due to their lack of utility since it is presented as a powder, being said compound characterized by the fact that it comprises:

at least one polymer of hydroxylated organic acids and at least one additive.

It is also another objective of the present invention to provide an agglutinated product for reconstituting these powders of vegetal origin, being said agglutinated product comprised of:

a mixture of said powder of vegetal origin, with at least one polymer of hydroxylated organic acids and with at least one additive.

It is, also, another objective of the present invention to provide an agglutinant compound and agglutinated product for reconstituting powders of vegetal origin, that allows employing a lamination or similar process, being said agglutinated product comprised of agglutinant compound and a vegetal mass formed by the powder of vegetal origin, that may range from 5-50% (mass/mass, regarding the powder mass used), with drying temperature ranging between 100-400° C., thickness between 0.05-2.50 mm and vegetal film humidity between 8 and 20%; being said agglutinant compound formed only by a mixture of polymers of hydroxylated organic acids, such as lactic acid and malic acid, and it may contain agents improving its agglutinant and sensorial properties.

It is a further objective of the present invention to provide a chemical compound to unite vegetal powder particulates, whose granulometry is insufficient for said material to be employed in producing products comprising, e.g., cigarettes, teas and flavored vegetal substrates, in order to produce lamination of vegetal substrates.

It is another objective of the present invention, to present an agglutinant compound for aggregating vegetal powder and particles, with low-cost execution, aggregating reliability and economy requisites, reassuring its utilitarian application, providing the industrial consumer of such input with additional freedom and option of choice in analogous market, offering a number of productive possibilities and benefits, converting it in a specific product of great expectation for this sector.

DETAILED DESCRIPTION OF THE INVENTION

The present invention relates to an agglutinant compound that may be used for obtaining a pellicle or laminated film of powders of vegetal origin for use in industries such as tobacco, tea and other foods. More specifically, said agglutinant compound is projected for producing tobacco sheets, coffee, cinnamon, clove, mate herb and other vegetal products as powder, allowing the use of a residue that is currently discarded in industries using these materials as leaves or any form other than non-pulverized, and that can not use them as powder.

The agglutinant compound has one polymer of hydroxylated organic acids as basis, more specifically, lactic acid and malic acid, and may have the addition of other additives improving its agglutinant properties and/or providing properties improving both physical and sensorial quality of the vegetal film to be formed. These additives may be hydroxylated organic acids in their monomeric form, amide, non-amylaceous hydrocolloids, sodium chloride, plasticizers, humectants, preservatives and additives, which are mixed with the vegetal powder and then are subjected to a laminating set comprised of two metallic cylindrical rolls that press the vegetal mass to form a leave or sheet of the desired vegetable.

In lamination, the vegetal mass formed by the powder of vegetal origin, agglutinant compound and water, is pressed to obtain a pellicle or film with thickness that may range between 0.05 and 2.50 mm and vegetal final film humidity may range between 8.0 and 20%.

The tobacco pellicle may be formed from tobacco powders of several origins, like those obtained as cigarette manufacturing by-products, tobacco processing plants, tobacco processing industries, etc., wherein powders from several types of tobacco can be used in the process, such as stems, 'scraps', 'winnovers' or 'winnowings', tobacco residues in general, tobacco pellicles of any type/class, etc.

Tests performed with wastes as powders from tobacco industry showed the viability of the present compound. The introduction of flavors or flavor or taste improvers has called companies' attention, since through this invention these flavors may be added along with the agglutinant compound, thus allowing a better fixation thereof, if compared with the simple aspersion over the leaves. Thus, organoleptic features superior to original product are obtained.

The agglutinant compound has shown to be effective for obtaining reconstituted products of vegetal origin with physical and sensorial characteristics very close or superior to original product and it can also be considered as a neutral product since it does not provide final product with undesirable characteristics.

In general, the invention refers to the obtainment of an agglutinant compound that mixed with desired vegetal powder and water, using a laminating roll system placed in the entrance of a dryer, has the ability to produce reconstituted leaves of any vegetal powder that can be used in tobacco and food industry. It is important to notice that such agglutinant compound allows the reconstitution of films from powders of vegetal origin with minimum use of water and in a considerably simple form (simply passing it through a press system—rolls or press—to obtain a thin film), thus, differing from other already existing reconstitution processes. The concentration of agglutinant compound in the vegetal mass (formed by powder of vegetal origin, agglutinant compound and water) may range from 5 to 50% (mass/mass, regarding the powder mass used), drying temperature may range from 100 to 400° C., the thickness of the vegetal pellicle to be obtained may range from 0.05 to 2.50 mm and the final humidity of the vegetal film may range from 8.0 to 20%. The agglutinant compound may be formed only by the mixture of polymers of organic acids, preferably lactic acid and malic acid, wherein agents improving its agglutinant and sensorial properties can be added, as well as other organic acids, in their monomeric form, amides, non-amylaceous hydrocolloids, sodium chloride, plasticizers, humectants, preservatives and flavoring additives.

The present invention also foresees the application of the agglutinant compound to produce vegetal films with flavor and taste corrected, improved, highlighted or modified due to the addition of flavors and additives specific for the agglutinant compound, which makes such inclusion of flavors and additives more effective, since with such process they would be more firmly attached to the matrix of the film to be generated, when compared to the current procedure in the industry (aspersion over the leaves).

It is object of this invention the use of the agglutinant compound to obtain pellicles of tobacco, coffee, cinnamon, clove, mate herb and other vegetal products as powders, mixtures thereof, or any other film of interest of tobacco and food industries. Applicant's researches showed that by using such agglutinant compound it is possible to obtain films from tobacco powder, mate herb powder, coffee powder, clove powder, licorice powder, catuaba powder, cinnamon powder, powder mixtures thereof, and any other powders that may be used in manufacturing flavored, reconstituted or modified vegetal films.

In accordance with the above mentioned, a modality of the invention foresees the addition of specific flavors and additives to correct, improve, highlight or modify the desired characteristics to the agglutinant compound. It must be clear that the application of the agglutinant compound to prepare laminated films from powders of vegetal origin aims to reuse such material that, according to the previous art, would be discarded with critical economic and environmental impacts, besides, producing a gamma of specific flavors and additives of great application and industrial interest.

The form in which the final material to be obtained after the process of formation of the vegetal film will be available for industry is only an operational procedure and the use of the material as a continuous film or pellicle, or as any other form, provide the same, if not superior, results as compared with the properties of the original material, thus, the obtained pellicle can be used directly by industry as a film, or undergo a cutting process with the objective of obtaining material of appropriate size and shape, wherein the final material to be made available for industries may be a continuous film, in pieces of several sizes, shredded, etc. Thus, if a specific company processes tobacco leaves and intends to use the reconstituted film of the tobacco powder obtained in its manufacturing process, previously the powder would undergo a lamination process with the agglutinant compound to re-prepare the leave, wherein in such lamination process the appropriate powder will be agglutinated with the other components to obtain the desired material. The advantage of such agglutinant compound is that the final manufacturer neither needs to discard the powder originated in its processing, nor to increase the use of powder for manufacturing its product, diminishing the quantity of residues, since it can also correct, improve, highlight or modify the flavor and taste of the final material to be obtained, with advantages for its process.

In order to verify the suitability of the agglutinant compound to the process, laboratorial equipment with production capacity of 10 kilograms/hour was produced, so that tests could be performed in industries using this material, wherein afterwards the equipment was improved for a production of 30 kilograms/hour for producing material for use by clients interested in equipment and processing of reconstituted leaves. The following powder pellicles may be obtained through the mixture of the agglutinant compound with powder of vegetal origin and water and after treatment in rolls and drying system: tobacco pellicle, catuaba pellicle, mate herb pellicle, clove pellicle, cocoa pellicle, tobacco pellicle with addition of specific flavors or additives aiming to correct, improve, highlight or modify a defined characteristic, pellicle of any vegetal powder, pellicle of mixture of any powder of vegetal origin and pellicle of vegetal powder or mixture of powders of vegetal origin with specific flavors and additives to provide final product with a defined characteristic. The base of the agglutinant compound is formed by polyhydroxylated organic acids, more specifically by poly(lactic acid) and by poly(malic acid), wherein both polymers poly(lactic acid) and poly(malic acid) are natural and biodegradable products, and the by-products of their decompositions are also of natural origin, i.e., lactic acid and malic acid, respectively, wherein several processes to obtain these two polymers are found described in literature, since basically their syntheses require the removal of water in temperature above 100° C., in the presence of an inorganic acid or specific catalyst. In order to obtain the agglutinant compound, the hydroxylated organic polyacid, e.g. poly (lactic acid) or poly (malic acid) or a mixture of both polyacids in different concentrations, is added to other additives, which will be further described. It is important to notice that the final composition of the agglutinant compound may vary according to the matrix (vegetal powder) which it is desired to work with, with the initial humidity of said matrix, with the temperature in which the mixture of the vegetal powder with the agglutinant compound will be performed, with the type of stirring used in such mixture, etc. Even inside only one type of matrix (e.g., tobacco), some variations may occur, since the different types of existing tobacco powders have different characteristics. The variation of the agglutinant compound composition will depend on the type of product that is desired to obtain at the end of the process, i.e., if a specific characteristic is necessary to the vegetal film to be formed, such characteristic must be obtained by the addition of specific agents, e.g., flavoring agents.

Concentrated solutions of sugars, starches and non-amylaceous hydrocolloids may be used as coadjuvants of the production process of the agglutinant compound. Among the sugars, we highlight the use of solid fructose, fructose syrup and maize glucose. Starches (modified or not) of maize, wheat, potato, rice, manioc, etc. may be used. Non-amylaceous hydrocolloids that may be used are acacia or Arabic gum, xanthan gum, guar gum, tara gum, carob (LBG), pectins, jellies, agar-agar, alginates, carrageen, carboxymethyl cellulose (CMC), hydroxypropyl cellulose (HPC) and microcrystalline cellulose (MCC). The sugars, starches and non-amylaceous hydrocolloids are auxiliary and work as sustaining agents until the polyacid used in the process can keep its final structure. The sugars, starches and non-amylaceous hydrocolloids may be used individually or in conjunction in the agglutinant compound. The concentration of these products when used in the agglutinant compound may vary from 5 to 60% (mass/mass).

The sodium chloride may also be used to increase the viscosity of the formulation, being in such case a coadjuvant in the lamination process of the final sheet. The concentration of sodium chloride when used in the agglutinant compound may range from 0.5 to 10.0% (mass/mass). The plasticizers have as function to keep the flexibility of the final sheet, which allows cutting, storing and posterior industrial processing thereof.

The humectants function to maintain the residual humidity in the system, so as to allow, along with plasticizers, a better flexibility capacity as related to the storage time for posterior industrial processing of the vegetal film to be produced. Among the plasticizers and humectants that may be used are glycerin, propylene glycol, a triacetin, glucose esters, and sucrose esters, ethyl ester of lactic acid, sucrose, glucose, citric acid, sorbitol, mannitol, magnesium sulfate, polydextrose and inverted sugar. The plasticizing agents and humectants may be used individually or in conjunction in the agglutinant compound. The concentration of these plasticizing agents and humectants when used in the agglutinant compound may range from 0.5 to 20.0% (mass/mass). In the agglutinant compound, the preservatives function to increase the storage time of the vegetal film to be produced, thus generating a better flexibility regarding the storage time for a posterior industrial processing thereof. Their use also aims to preserve the final product to which the vegetal film will be applied, e.g., in the manufacture of cigarettes or tea, to increase the storage time and/or expiration date of the final product (cigarette or tea) to which the vegetal film will be attached. During the choice of the best preserving agent for a specific vegetal film, it must taken into account the physical and chemical properties of the starting product (vegetal powder) and the final product to which the vegetal film will be incorporated, its storage conditions and the probable contaminant microorganisms such as fungi, bacteria and yeasts. Like all chemical additives, the preservatives may contribute with their portion of toxicity, thus needing a continuous control of their use, to ensure that they are in the limit range considered safe. Thus, the preservatives that may be used in the agglutinant compound developed are propionic acid and propionates, potassium sorbate, lactic acid, acetic acid, citric acid, sodium benzoate and parabens. These preservative agents may be used individually or in conjunction in the agglutinant compound. The concentration of these preservative agents when used in the agglutinant compound may range from 0.5-2.0%, always depending on the final objective (conservation needs of the vegetal film and/or conservation needs of the matrix to which the vegetal film will be attached). Laws regarding each country/final product also must be taken into account, as well as the quantity of agglutinant compound present in the vegetal film. Specific agents for controlling the final color of the film may also be added to the agglutinant compound. Thus, colorants or whitening agents may be used to modify, darken or whiten the color of the vegetal film to be formed. Among the products that may be used in the agglutinant compound are included colorants in general, such as colorant caramel. Said agents for color control may be used individually or in conjunction in the agglutinant compound. The concentration of these agents, when used in the agglutinant compound, may range from 0.01 to 10.0%, always depending on the final objective (of the desired final color to be obtained for the vegetal film that will be generated). Agents for burn control of the vegetal film to be formed may also be added to the agglutinant compound. Thus sodium chloride, potassium citrate and diamonic and monoamonic phosphate (DAP and MAP) may be used to speed or diminish the burn speed of the vegetal film to be formed. These agents for burn control may be used individually or in conjunction in the agglutinant compound. The concentration of these agents when used in the agglutinant compound may range from 1 to 10.0%, always depending on the final objective (of the desired burn speed to be obtained for a determined vegetal film, e.g., for a film formed from tobacco powder).

The introduction of specific flavors and additives that correct, improve, highlight or modify the flavor and taste of the starting material has raised great interest of the companies, since these specific flavors and additives, by the developed process, may be added along with the agglutinant compound, thus becoming more firmly attached to the film generated than if it was simply aspersed on the leave surface, like one of the usual addition processes thereof, thus providing organoleptic characteristics superior to the original product or even of application of specific flavors and additives for process of the usual application, i.e., aspersion on the surface of the leaves. Thus, several flavors and additives, e.g. fruits, sweets, chocolate, vanillic (vanillin or vanilla extracts), mentholated, tobacco, clove, cinnamon, cherry, tartaric acid, citric acid, laevulinic acid, licorice, cocoa, etc., may be added, as well as additives that correct specific flaws in flavor and taste of the film to be obtained. These flavors and additives may be used individually or in conjunction in the agglutinant compound. The concentration of these flavors and additives when used in the agglutinant compound may range from 0.01 to 50.0% (mass/mass).

The present invention is better illustrated according to the following examples, which shall not be seen as a limitation imposed to the scope thereof. Instead, it must be clear, by reading the present description, that other realizations, modifications and equivalents thereof may be applied, as suggested by those skilled in the art, without departing from the spirit of the present invention and/or scope of the annexed claims.

Example 1

1) The agglutinant compound was obtained through the hot mixture (80° C.), in single screw extruder, of 50% poly (lactic acid) obtained by heating lactic acid at a temperature above 100° C., in the presence of phosphoric acid, for 12 hours, with 2% sodium benzoate (as preservative agent), 33% maize glucose, 5% propylene glycol, 5% xanthan gum and 5% citric acid. Said agglutinant compound (15 Kg) was mixed to 100 Kg tobacco (Burley pellicles stem), obtained as residue of tobacco processing plants. Before being used, tobacco was previously milled at 40 MESH, to facilitate the mixture process. After 10 minutes, 100 liters of water were added. This mixture was then subjected to pressing through a system of rolls and posterior drying.

The pellicle of material obtained presented mechanic properties similar to a tobacco pellicle, with plain and smooth surface. When smoked, it presented properties superior to the material of origin. The same example mentioned was repeated with the use of different tobacco matrixes, such as tobacco powder originated from primary and secondary process of cigarette industries, powder obtained in tobacco processing plants, etc. The obtained final film basically presented the same properties above described.

2) The agglutinant compound was obtained through the hot mixture (90° C.), in single screw extruder, of 25% poly(lactic acid) obtained by heating lactic acid at a temperature above 100° C., in the presence of phosphoric acid, for 12 hours, with 5% of poly(malic acid), 0.5% sodium benzoate, as preservative agent, 33% maize glucose, 7% propylene glycol, 10% carboxymethyl cellulose, 1% chocolate flavor, 5% powder cocoa (with a fat content of 10-12%) and 13.5% water. This agglutinant compound, in 25 Kg, was mixed with 100 Kg mate herb purchased in market. Before being used, the mate herb was previously milled at 40 MESH, to facilitate the mixture process. After 10 minutes, 80 liters of water were added. This mixture was then subjected to pressing through a system of rolls and posterior drying and formation of the mate herb film with a pleasant chocolate flavor.

3) The agglutinant compound was obtained by hot mixture (100° C.), in single screw extruder, of 35% poly (lactic acid), 1% sodium benzoate as preservative agent, 33% maize glucose, 5% propylene glycol, 5.5% glycerin, 15% xanthan gum, 0.5% sodium chloride and 5% powder cinnamon. This agglutinant compound, 25 Kg, was mixed with 100 Kg tobacco (smoke powder generated from the secondary process of cigarette industries). Before being used, tobacco was previously milled at 40 MESH, to facilitate the mixture process. After 10 minutes, 80 liters of water were added. This mixture was then subjected to pressing through a system of rolls and posterior drying. The pellicle of obtained material presented mechanic properties similar to a tobacco pellicle, with plain and smooth surface. When smoked, it presented a pleasant cinnamon flavor.

The above example was repeated with the use of different tobacco matrixes, such as smoke powder originated from primary process and of cigarette industries, powder obtained from tobacco processing plants, etc. The obtained final film presented basically the same properties above described.

Thus, the present invention was conceived aiming to obtain a chemical compound to agglutinate vegetal particulates, with the minimal number possible of chemical processes, conveniently developed and conceived to allow the user to have available an organically inert product and that does not offer risks to health, showing outstanding practicality and versatility, incorporating a distinct performance. Its innovative concept allows the obtainment of a productive process with excellent level of quality, being developed according to most modern techniques, thus allowing a simplified use, relative to the use in industry of tobacco and food transformation.

It must be understood that the product developed for agglutinate powders of vegetal origin is simple in its construction, therefore being of easy execution, thus obtaining excellent practical and functional results, incorporating an innovative and effective technology. Since the agglutinant compound is produced with raw materials of quality and innocuous to human organism, it offers to the user quality and safety, offering a number of applications pertinent to industrial sector. Then, for better understanding and comprehension of how the agglutinant compound is constituted for use in reconstitution of powders of vegetal origin by lamination process or similar herein, the following description of the production process is provided:

Generally, the present invention relates to the obtainment of an agglutinant compound that, in mixture with desired vegetal powder and water, using a laminating roll system placed in the entrance of a dryer, has the ability to produce reconstituted leaves of any vegetal powder that can be used in tobacco and food industry. It is important to notice that such agglutinant compound allows the reconstitution of films from powders of vegetal origin with minimum use of water and in a considerably simple form (simply passing it through a press system—rolls or press—to obtain a thin film), thus differing from other already existing reconstitution processes. The concentration of agglutinant compound in the vegetal mass (formed by powder of vegetal origin, agglutinant compound and water) may range from 5 to 50% (mass/mass, regarding the powder mass used), drying temperature may range from 100 to 400° C., the thickness of the vegetal pellicle to be obtained may range from 0.05 to 2.50 mm and the final humidity of the vegetal film may range from 8.0 to 20%.

The agglutinant compound may be formed only, or by the mixture, of polymers of organic acids, preferably lactic acid and malic acid, wherein agents improving its agglutinant and sensorial properties can be added, as well as other organic acids, in their monomeric form, starches, non-amylaceous hydrocolloids, sodium chloride, plasticizers, humectants, preservatives and flavoring additives.

The present invention also foresees the application of the agglutinant compound to produce vegetal films with flavor and taste corrected, improved, highlighted or modified due to the addition of flavors and additives specific for the agglutinant compound, which makes such inclusion of flavors and additives more effective, since with such process they would be more firmly attached to the matrix of the film to be generated, if compared with usual use in industry, e.g. aspersion over the leaves. It is intention of the invention the use of the agglutinant compound to obtain films from pellicles of tobacco, coffee, cinnamon, clove, mate herb and other vegetal products as powders, mixtures of the products previously mentioned, or any other film of interest for tobacco and food industries.

Through the above exposed, it can be noticed that the agglutinant compound herein for use in reconstitution of powders of vegetal origin by lamination process or similar, is characterized by agglutinant chemical compound to obtain a vegetal laminate presenting, as can be evidenced due to analyses performed, a number of differences from conventional existing products in this market sector, plus chemical and functional characteristics completely different from those pertinent to the state of the art.

The invention claimed is:

1. An agglutinant compound, innocuous to human organisms, for reconstituting residual powders of vegetal origin, comprising:
   (a) at least one polymer of hydroxylated organic acids selected from the group consisting of poly (malic acid) and a mixture of poly (malic acid) and poly (lactic acid);
   (b) sugars in an amount of from 5% to 60% mass/mass;
   (c) non-amylaceous hydrocolloids in an amount of from 5% to 60% mass/mass; and
   (d) at least one additive.

2. The compound of claim 1, wherein the at least one additive (d) is selected from the group consisting of organic acids in their monomeric form, starches, plasticizers, colorants, whitening agents, humectants, preservatives, flavorings, viscosity improving agents, and mixtures thereof.

3. The compound of claim 2, wherein the sugars (b) are selected from the group consisting of solid fructose, fructose syrup, maize glucose, and mixtures thereof.

4. The compound of claim 2, wherein the starches are selected from the group consisting of starches, modified or not, maize, wheat, potato, rice, manioc, and mixtures thereof.

5. The compound of claim 2, wherein the non-amylaceous hydrocolloids (c) are selected from the group consisting of acacia gum, Arabic gum, xanthan gum, guar gum, tara gum, carob (LBG), pectins, gel, agar-agar, alginates, carrageen, carboxymethyl cellulose (CMC), hydroxypropyl cellulose (HPC), microcrystalline cellulose (MCC), and mixtures thereof.

6. The compound of claim 2, wherein the starches are present in an amount of between 5% to 60% mass/mass.

7. The compound of claim 2, wherein the humectants are present in an amount of between 0.5% to 20% mass/mass and are selected from the group consisting of glycerin, propylene glycol, triacetin, glucose esters, sucrose esters, ethyl ester of the lactic acid, sucrose, glucose, citric acid, sorbitol, manitol, magnesium sulfate, polydextrose, inverted sugar, and mixtures thereof.

8. The compound of claim 2, wherein the preservatives are present in an amount of from 0.5% to 2.0% and are selected from the group consisting of propionic acid, propionates, potassium sorbate, lactic acid, acetic acid, citric acid, sodium benzoate, parabens, and mixtures thereof.

9. The compound of claim 2, wherein the colorants are present in an amount of between 0.01% and 10.0%, and the whitening agents are present in an amount of between 0.01% and 10.0%.

10. The compound of claim 2, wherein the flavorings are present in an amount of between 0.01% and 50.0% and are selected from the group consisting of essences from fruits, sweeteners, chocolate, vanillin extract, vanilla extract, menthol scent, tobacco, clove, cinnamon, cherry, tartaric acid, citric acid, laevulinic acid, licorice, cocoa, and mixtures thereof.

11. The compound of claim 2, wherein:
the at least one polymer of hydroxylated organic acids (a) is a mixture of poly(lactic acid) in an amount of 25% and poly (malic acid) in an amount of 5%;
the preservative is sodium benzoate in an amount of 0.5%;
the sugar (b) is maize glucose in an amount of 33%; the humectant is propylene glycol in an amount of 7%;
the non-amylaceous hydrocolloid (c) is carboxymethyl cellulose in an amount of 10%;
the flavoring is (i) chocolate flavor in an amount of 1% and (ii) powder cocoa, having a fat content of 10% to 12%, in an amount of 5%; and
water in an amount of 13.5%.

12. The compound of claim 2, wherein the plasticizers are present in an amount of between 0.5% to 20% mass/mass and are selected from the group consisting of glycerin, propylene glycol, triacetin, glucose esters, sucrose esters, ethyl ester of the lactic acid, sucrose, glucose, citric acid, sorbitol, manitol, magnesium sulfate, polydextrose, inverted sugar, and mixtures thereof.

13. The compound of claim 1, wherein the additive (d) comprises sodium chloride as a viscosity improving agent in an amount of between 0.5% to 10% mass/mass.

14. The compound of claim 1, wherein the additive (d) further comprises an agent selected from the group consisting of sodium chloride, potassium citrate, diammonium phosphate, monoammonium phosphate, mixtures thereof, in an amount of from 1% to 10% mass/mass.

15. An agglutinated product comprising a mixture of:
(i) residual powder of vegetal origin; and
(ii) the agglutinant compound of claim 1.

16. The agglutinated product of claim 15, wherein the agglutinant compound (II) is present in an amount of from 5% to 50% and the residual powder (i) is present in an amount of from 50% to 95% mass/mass of the mixture.

17. An agglutinant compound, innocuous to human organisms, for reconstituting residual powders of vegetal origin, comprising:
(a) at least one polymer of hydroxylated organic acids selected from the group consisting of poly (malic acid) and a mixture of poly (malic acid) and poly (lactic acid);
(b) sugars in an amount of from 5% to 60% mass/mass;
(c) non-amylaceous hydrocolloids in an amount of from 5% to 60% mass/mass; and
(d) at least one additive;
wherein the polymer is present in an amount of from 5% to 50%.

* * * * *